US008913173B2

(12) United States Patent
Onomura (10) Patent No.: US 8,913,173 B2
(45) Date of Patent: Dec. 16, 2014

(54) IMAGING APPARATUS AND IMAGING METHOD

(75) Inventor: Kenichi Onomura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 598 days.

(21) Appl. No.: 12/910,585

(22) Filed: Oct. 22, 2010

(65) Prior Publication Data

US 2011/0109774 A1    May 12, 2011

(30) Foreign Application Priority Data

Nov. 6, 2009    (JP) .................. 2009-255434

(51) Int. Cl.
*H04N 5/222*  (2006.01)
*H04N 5/357*  (2011.01)
*G06T 3/00*   (2006.01)
*G06T 5/00*   (2006.01)

(52) U.S. Cl.
CPC ............ *H04N 5/3572* (2013.01); *G06T 3/0062* (2013.01); *G06T 5/006* (2013.01); *G06T 2207/10004* (2013.01)
USPC .................................................. 348/333.12

(58) Field of Classification Search
CPC ........................ H04N 5/23293; H04N 5/23296
USPC .......... 348/239, 240.1, 240.2, 240.3, 240.99, 348/241, 333.08, 333.12, 335, 345, 347, 348/369, 305, 320, 322
See application file for complete search history.

(56) References Cited

U.S. PATENT DOCUMENTS 5,712,474 A * 1/1998 Naneda ....................... 250/208.1
5,905,530 A * 5/1999 Yokota et al. ............. 348/240.99
7,227,574 B2 * 6/2007 Yamanaka ................... 348/242
7,881,563 B2 * 2/2011 Mandy et al. ................ 382/300
2006/0188172 A1 * 8/2006 Higurashi et al. ............ 382/275
2009/0141148 A1 * 6/2009 Imamura ...................... 348/241

FOREIGN PATENT DOCUMENTS

| CN | 101076083 | 11/2007 |
| CN | 101079965 | 11/2007 |
| CN | 101388966 | 3/2009 |

(Continued)

OTHER PUBLICATIONS

Notification of the First Office Action for Chinese Patent Application No. 201010543070.3, mailed Jul. 6, 2012 (5 pgs.) with translation (9 pgs.).

(Continued)

*Primary Examiner* — Lin Ye
*Assistant Examiner* — Chriss Yoder, III
(74) *Attorney, Agent, or Firm* — John C. Pokotylo; Straub & Pokotylo (57) ABSTRACT

An imaging apparatus includes an imaging section, an imaging acquisition range control section, a distortion information obtaining section, and a display section. The imaging section includes a lens and obtains an image data by imaging a subject image. The imaging acquisition range control section controls an acquisition range of the image data such that a part of the subject image is read out. The distortion information obtaining section obtains distortion information of the lens. The distortion correction section corrects distortion of the image data in accordance with the distortion information. The display section performs enlarged live-view display operation to display an enlarged image of the corrected image data in the acquisition range. The imaging acquisition range control section updates the acquisition range, when the distortion information is changed while the enlarged live-view display operation is performed, in accordance with the changed distortion information.

4 Claims, 6 Drawing Sheets

(56) References Cited

FOREIGN PATENT DOCUMENTS

| CN | 101510956 | 8/2009 |
| JP | 6-237406 | 8/1994 |
| JP | 2000-106623 | 4/2000 |
| JP | 2005-45513 | 2/2005 |
| JP | 2006-270918 | 10/2006 |
| JP | 2007-135135 | 5/2007 |

OTHER PUBLICATIONS

Office Action for Japanese Patent Application No. 2009-255434, mailed Jul. 9, 2013 (2 pgs.) with English translation (2 pgs.).

* cited by examiner

IMAGING APPARATUS AND IMAGING METHOD

CROSS-REFERENCE TO RELATED APPLICATIONS

This application is based upon and claims the benefit of priority from prior Japanese Patent Application No. 2009-255434, filed Nov. 6, 2009, the entire contents of which are incorporated herein by reference.

BACKGROUND OF THE INVENTION

1. Field of the Invention

The present invention relates to an imaging apparatus having a distortion correction function, and an imaging method used in the imaging apparatus.

2. Description of the Related Art

In recent years, an increasing number of imaging apparatuses such as digital cameras have a live-view display function (also referred to as through-image display function). The live-view display function is a function of displaying an image, which is obtained by performing continuous imaging by an imaging device, on a display section in real time. The live-view display function enables the user to check composition in photographing and the like, by using the display section provided on the back surface of the digital camera. In addition, recently a function of the imaging device has also been improved, and there are imaging devices which can capture only signals corresponding to a partial range of the imaging devices. In recent years, enlarged live-view display operation has also become possible, by using the function of the imaging device described above. The enlarged live-view operation means operation of enlarging a partial range of the image displayed by the live-view display function and subjecting the part to live-view display, when the partial range of the image displayed is designated by the user.

The imaging apparatuses such as digital cameras generally have a lens to form a subject image on the imaging device. Since the lens has distortion, the subject image formed on the imaging device through the lens has a distorted shape with respect to the shape of the subject to be actually obtained. In recent years, various proposals have been made with respect to imaging apparatuses which have an electronic distortion correcting function of electronically correcting a distorted image obtained from the imaging device into an image with no distortion. For example, in Jpn. Pat. Appln. KOKAI Pub. No. 2005-45513, a desired small area in an image is read out and distortion correction for each small area can be performed. By using the method of Jpn. Pat. Appln. KOKAI Pub. No. 2005-45513, distortion correction can be performed also in the enlarged live-view operation.

BRIEF SUMMARY OF THE INVENTION

According to a first aspect of the invention, there is provided an imaging apparatus comprising: an imaging section including a lens to form a subject image, configured to obtain an image data by imaging the subject image formed by the lens; an imaging acquisition range control section configured to control a acquisition range of the image data obtained by the imaging section, such that a part of the subject image is read out; a distortion information obtaining section configured to obtain distortion information of the lens; a distortion correction section configured to correct distortion of the image data in the acquisition range obtained by control of the imaging acquisition range control section, in accordance with the distortion information obtained by the distortion information obtaining section; and a display section configured to perform enlarged live-view display operation to display an image obtained by enlarging the image data in the acquisition range, the image data in the acquisition range corrected by the distortion correction section, wherein the imaging acquisition range control section updates the acquisition range, when the distortion information of the lens is changed while the enlarged live-view display operation is performed by the display section, in accordance with the changed distortion information of the lens.

According to a second aspect of the invention, there is provided an imaging method comprising: imaging a subject image, which is formed by a lens to form the subject image, by an imaging device, and thereby obtaining an image data; obtaining distortion information of the lens; controlling an acquisition range of the image data obtained by the imaging device such that a part of the subject image is read out, in accordance with change of the distortion information of the lens; correcting distortion of the image data in the acquisition range, in accordance with the obtained distortion information; enlarging the image data in the acquisition range, the distortion of which has been corrected; and displaying an image based on the enlarged image data on a display section.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be explained hereinafter with reference to drawings.

Figure 1:
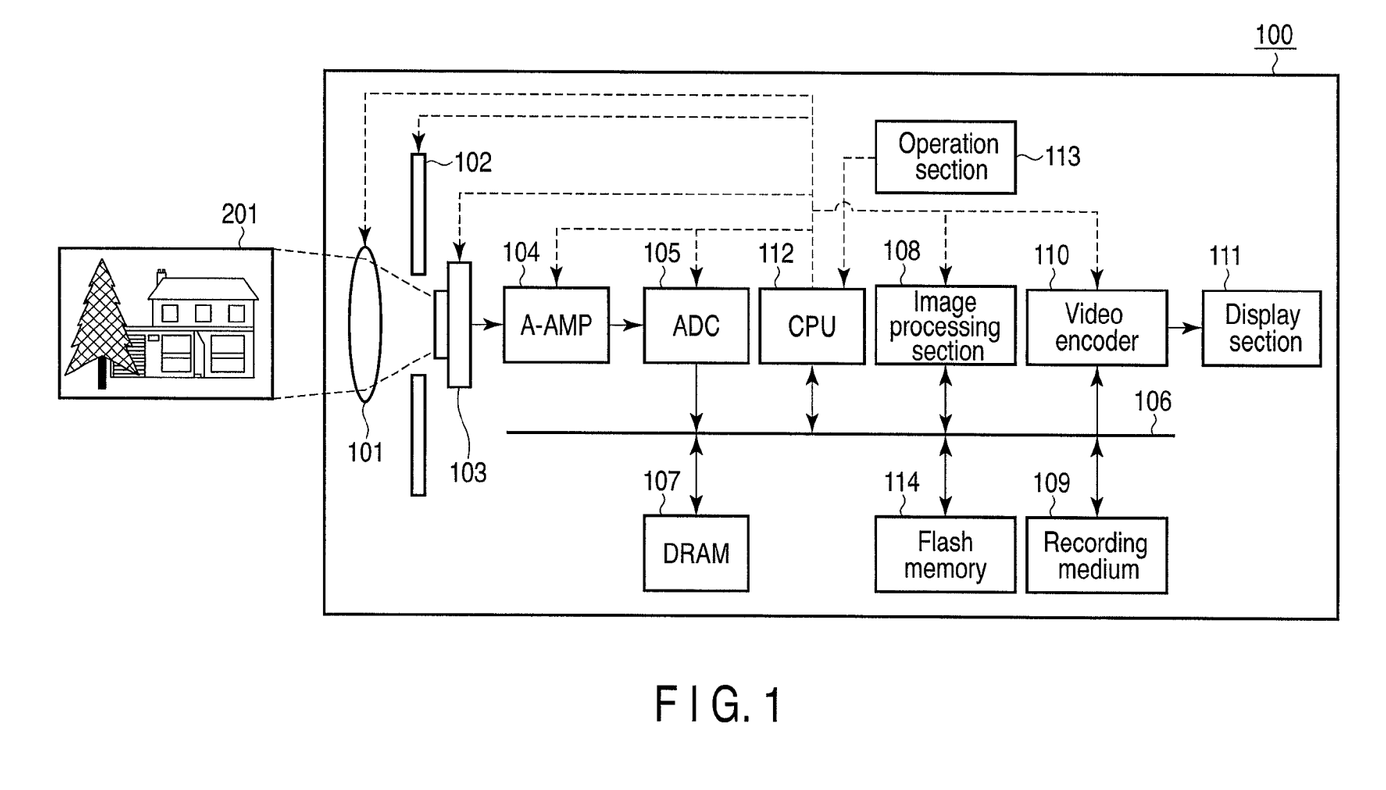
FIG. 1 is a block diagram illustrating a structure of a digital camera serving as an example of an imaging apparatus according to an embodiment of the present invention.

FIG. 1 is a block diagram illustrating a structure of a digital camera serving as an example of an imaging apparatus according to an embodiment of the present invention. A digital camera 100 illustrated in FIG. 1 comprises a lens 101, an aperture 102, an imaging device 103, an analogue amplifier (A-AMP) 104, an analogue-digital converter (ADC) 105, a bus 106, a DRAM 107, an imaging processing section 108, a recording medium 109, a video encoder 110, a display section 111, a CPU 112, an operation section 113, and a flash memory 114. FIG. 1 illustrates an example in which the lens 101 is formed as one unitary piece with the main body of the digital camera 100.

The lens 101 has an optical system formed of a plurality of lenses, such as a zoom lens to change the angle of view of an image obtained by the imaging device 103, and a focus lens to adjust the focus position of the lens 101. The lens 101 forms a subject image 201 on the imaging device 103. The zoom lens and the focus lens are driven and controlled by the CPU 112. The aperture 102 is disposed between the lens 101 and the imaging device 103, and controls a light incident quantity on a photoelectric conversion surface of the imaging device 103. The aperture 102 is opened and closed by the CPU 112.

The imaging device 103 has a photoelectric conversion surface to receive the subject image 201 which is made incident through the lens 101. The photoelectric conversion surface is formed of pixels which are arranged in a two-dimensional manner and formed of photoelectric conversion devices (such as photodiodes) to convert a light quantity into an electric charge quantity. The imaging device 103 converts the subject image 201 which is made incident through the lens 101 into an electric signal (image signal), and outputs the electric signal to the A-AMP 104. The CPU 112 which has a function as an imaging acquisition range control section controls operation of the imaging device 103, and controls capturing of an electric signal obtained by the imaging device 103.

Suppose that the imaging device 103 according to the present embodiment can capture an image signal for each pixel or each row of the photoelectric conversion surface. An imaging device of, for example, a CMOS type imaging device can be mentioned as an imaging device which can capture an image signal for each pixel or each row like this. By enabling capturing of an imaging signal for each pixel or each row, the CPU 112 can control an acquisition range of an image signal obtained by the imaging device 103, to read out a part of the subject image 201.

The A-AMP 104 amplifies the image signal captured from the imaging device 103 at a predetermined gain designated by the CPU 112. The ADC 105 converts an analogue image signal output from the A-AMP 104 into a digital image signal (hereinafter referred to as "an image data").

The bus 106 is a transmission path to transmit various data generated in the digital camera 100 to various sections of the digital camera 100. The bus 106 is connected to the ADC 105, the DRAM 107, the imaging processing section 108, the recording medium 109, the video encoder 110, the display section 111, the CPU 112, and the flash memory 114.

The DRAM 107 is a storage section which temporarily stores various data, such as the image data obtained by the ADC 105 and an image data processed by the image processing section 108.

The image processing section 108 performs various images processing for an image data obtained by the ADC 105 and stored in the DRAM 107. The image processing section 108 has a function as distortion information obtaining section and distortion correction section. The image processing section 108 performs distortion correction processing to correct distortion occurring in the image data due to distortion of the lens 101, based on distortion information. The distortion correction processing is performed in accordance with distortion information of the lens 101. The distortion information is information which indicates a degree of distortion in the image data which passes through the lens 101 and obtained through the imaging device 103. The distortion information is stored in, for example, the flash memory 114. The image processing section 108 obtains distortion information, and calculates a function which indicates correlation between coordinates of the image data before being subjected to distortion correction and coordinates of an image data to be obtained after distortion correction, based on the obtained distortion information. Then, the image processing section 108 corrects distortion in the image data, by performing coordinate transformation of the image data before being subjected to distortion correction in accordance with the calculated function.

In addition, the image processing section 108 also performs, for example, white-balance correction processing, color correction processing, gamma conversion processing, resizing processing, and compression processing. Besides, when the image is played back, the image processing section 108 also performs expansion processing of the compressed image data.

The recording medium 109 stores an image data obtained by photographing. The recording medium 109 is a recording medium formed of, for example, a memory card which is attachable to and detachable from the main body of the digital camera 100, but is not limited to it.

The video encoder 110 performs various processing to display an image on the display section 111. Specifically, the video encoder 110 reads out an image data, which has been resized by the image processing section 108 in accordance with the screen size of the display section 111 and stored in the DRAM 107, from the DRAM 107, converts the read image data into an image signal and then outputs the image signal to the display section 111 to display the image. The display section 111 is a display section formed of, for example, a liquid crystal display.

The CPU 112 controls various sequences of the digital camera 100. When the operation section 113 is operated, the CPU 112 reads out a program which is necessary for performing various sequences and is stored in the flash memory 114, and controls the various sequences.

The operation section 113 includes operation members such as a release button, a power button, and various input keys. When any of the operation members of the operation section 113 is operated by the user, the CPU 112 performs various sequences in accordance with the user's operation.

The flash memory 114 stores various parameters necessary for operation of the digital camera, and programs to be executed by the CPU 112. The CPU 112 performs various processing in accordance with the programs stored in the flash memory 114, and by reading parameters necessary for various sequences from the flash memory 114. The flash memory 114 in the present embodiment stores distortion information of the lens 101, as one of the parameters necessary for operation of the digital camera. The distortion information is distortion of the whole optical system included in the lens 101. Therefore, when the lens 101 includes a zoom lens and a focus lens, the distortion information changes according to the position of the zoom lens and the position of the focus lens. Thus, when the lens 101 includes a zoom lens and a focus lens as in the present embodiment, distortion information is stored for each position information of the zoom lens and for each position information of the focus lens. In addition, the flash memory 114 also stores an image data to display an enlargement frame, which is displayed together with a live-view image in normal live-view display described later.

Figure 2:
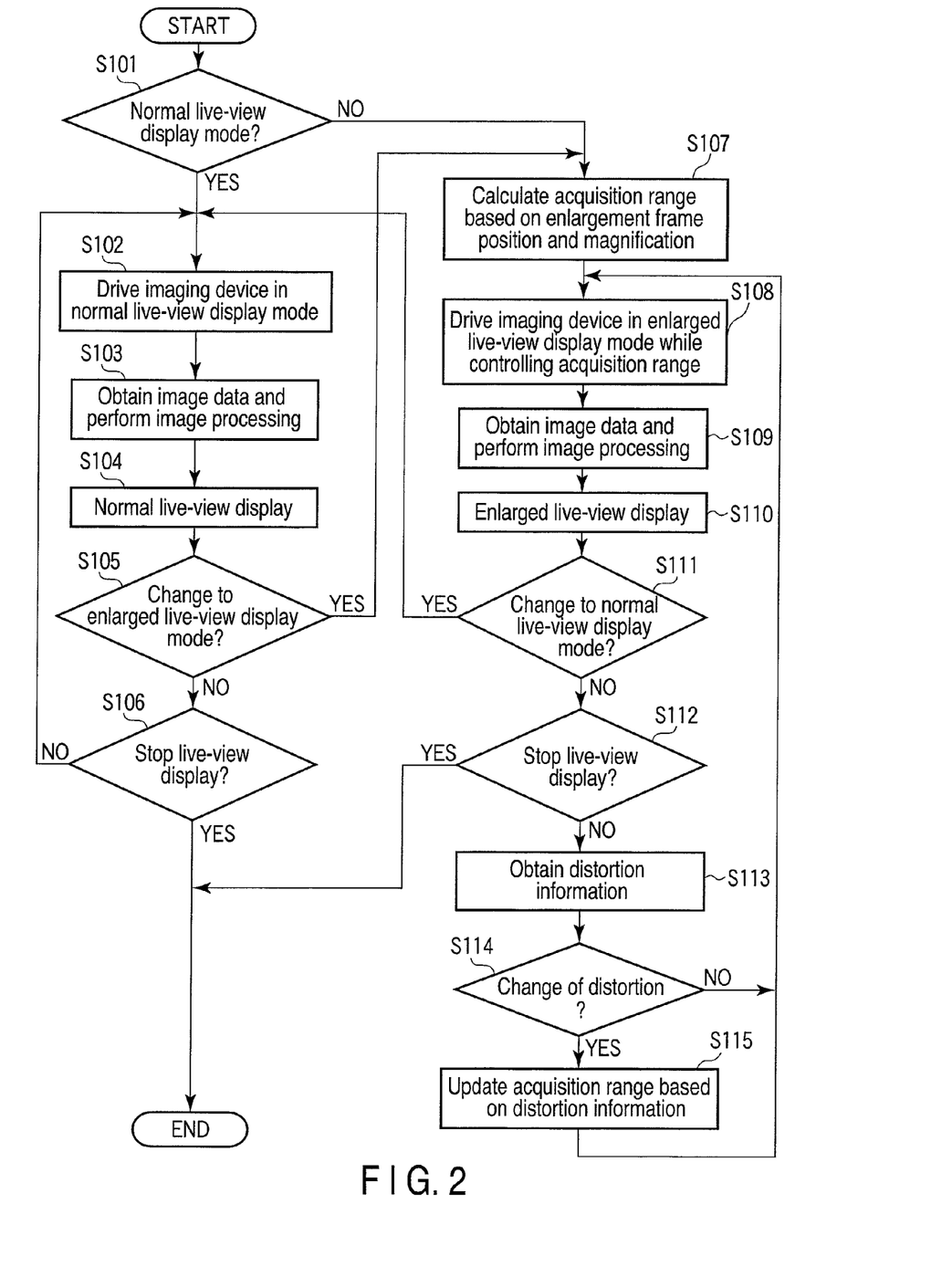
FIG. 2 is a flowchart illustrating processing performed in live-view display operation in a digital camera, which serves as an example of an imaging method according to the embodiment.

Next, live-view display operation in the digital camera 100 according to the present embodiment will be described hereinafter. FIG. 2 is a flowchart illustrating processing performed in live-view display operation in the digital camera 100, which is an example of an imaging method according to the present embodiment.

The processing of FIG. 2 is started, when live-view display operation is performed after the power of the digital camera 100 is turned on. After the processing of FIG. 2 is started, the CPU 112 determines whether the current live-view display mode of the digital camera 100 is the normal live-view display mode (Step S101). In the present embodiment, the live-view display mode includes the normal live-view display mode and the enlarged live-view display mode. The normal live-view display mode is a live-view display mode in which an image corresponding to the whole pixel range (whole angle of view) of the imaging device 103 is displayed in real time on the display section 111. On the other hand, the enlarged live-view display mode is a live-view display mode in which an image corresponding to a partial range designated by the user is enlarged according to a magnification set by the user, and displayed in real time on the display section 111. For example, when the operation section 113 is provided with an operation member for switching the live-view display modes, the operation section 113 can switch the normal live-view display mode and the enlarged live-view display mode. As another example, the normal live-view display mode and the enlarged live-view display mode may be switched on a menu screen of the digital camera 100. In addition, also when a range in the display section 111 is designated by the user during the normal live-view display, the normal live-view display mode is switched to the enlarged live-view display mode, details of which will be described later.

When the current live-view display mode is the normal live-view display mode in the determination of Step S101, or when the display mode is switched to the normal live-view display mode in determination of Step S111 described later, the CPU 112 drives the imaging device 103 in the normal live-view display mode to perform normal live-view display operation (Step S102). In such a case, the CPU 112 sets the whole pixel range of the imaging device 103 as the acquisition range of the imaging signal.

Figure 3:
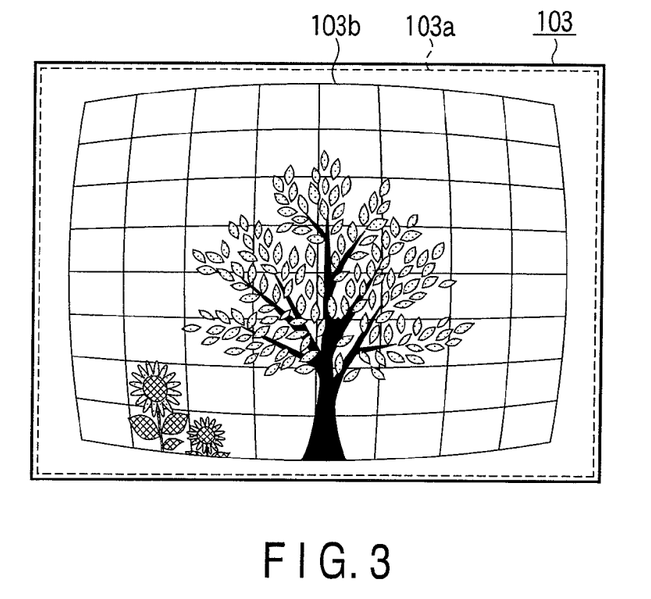
FIG. 3 is a diagram illustrating an acquisition range of an image signal in a normal live-view display mode.

FIG. 3 is a diagram illustrating an acquisition range of an image signal in the normal live-view display mode. In the normal live-view display mode, the CPU 112 controls the acquisition range to capture an image signal of the acquisition range 103*a* which corresponds to the whole pixel range (the whole angle of view of the imaging device 103) of the imaging device 103 illustrated in FIG. 3. In the normal live-view display mode, it is desirable to capture an image signal by interlacing. Although the resolution of the image displayed on the display section 111 reduces by capturing the image signal by interlacing, the time taken for capturing the image signal and the time taken for image processing can be reduced. Thereby, it is possible to display the image at high frame rate. Since the lens 101 has distortion, the subject image in a distorted state is formed on the imaging device 103. The distortion is denoted by reference number 103*b* in FIG. 3. The example of FIG. 3 shows a state in which the subject image is distorted in a barrel shape. There are cases where the subject image is distorted in a pin-cushion shape according to the type of the lens 101, the zoom position and the focus position. Such distortion is corrected by image processing by the image processing section 108.

After the imaging device 103 is driven, an image signal corresponding to the whole pixel range (every one or more lines in the case of interlacing) of the imaging device 103 is output. The image signal is amplified by the A-AMP 104, and thereafter converted into a digital image data by the ADC 105. The image data is stored in the DRAM 107 through the bus 106. Thereafter, the CPU 112 issues an instruction to the image processing section 108 to perform image processing for the image data stored in the DRAM 107. In receipt of the instruction, the image processing section 108 reads out the image data from the DRAM 107, and performs image processing such as distortion correction for the read image data (Step S103). The image data which has been subjected to image processing by the image processing section 108 is stored in the DRAM 107. Thereafter, the CPU 112 issues an instruction to the video encoder 110 to perform normal live-view display. In receipt of the instruction, the video encoder 110 reads out the image data from the DRAM 107, converts the read image data into an image signal and then outputs the image data to the display section 111 to display a live-view image. In addition, the video encoder 110 reads out an image data for enlargement frame display from the flash memory 114, converts the image data for enlargement frame display into an image signal, and then outputs the image signal to the display section 111 to display the enlargement frame on the live-view image displayed on the display section 111 (Step S104). The display position of the enlargement frame is, for example, a display position of the enlargement frame in the previous normal live-view display.

Figure 4:
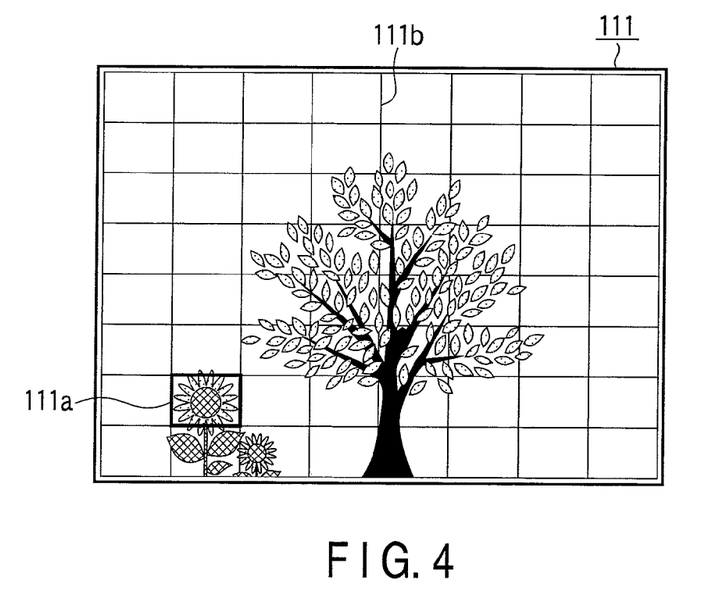
FIG. 4 is a diagram illustrating an example of an image displayed on a display section by normal live-view display operation.

FIG. 4 illustrates an example of an image displayed on the display section 111 by normal live-view display operation. As illustrated in FIG. 4, in the normal live-view display mode, a live-view image corresponding to the whole angle of view (actually the range 103*b*) of the imaging device 103 illustrated in FIG. 3 is displayed. Prior to this display, distortion of the image data caused by distortion of the lens 101 is corrected by the image processing section 108, as denoted by reference number 111*b* of FIG. 4. In addition, a rectangular enlargement frame 111*a* is superposed and displayed on the live-view image. The enlargement frame 111*a* is movable on the screen of the display section 111, in accordance with operation of the operation section 113 by the user. The user can select a small range in the screen of the display section 111 by the enlargement frame 111*a*.

After normal live-view display is performed, the CPU 112 determines whether to change the live-view display mode to the enlarged live-view display mode (Step S105). In the determination, it is determined to change the live-view display mode to the enlarged live-view display mode, for example, when the operation section 113 issues an instruction to change the mode to the enlarged live-view display mode, when it is instructed by the user on the menu screen of the digital camera 100 to change the mode to the enlarged live-view display mode, or when a small range in the screen of the display section 111 is selected by using the enlargement frame 111*a*. When the mode is not changed to the enlarged live-view display mode in the determination of Step S105, the CPU 112 determines whether to stop the live-view display operation (Step S106). In the determination, it is determined to end the live-view display operation, for example, when the power of the digital camera 100 is turned off, or when it is instructed by the user by operation of the release button of the operation section 113 to perform photographing by the digital camera 100. When the live-view display operation is not ended in the determination of Step S106, the processing is returned to step S102. In this case, the CPU 112 continues operation corresponding to the normal live-view display mode. On the other hand, when the live-view display operation is ended in the determination of Step S106, the CPU 112 ends the processing of FIG. 2. Thereafter, the CPU 112 performs processing, such as turning off the power of the digital camera 100 or performing photographing operation.

In addition, when the current live-view display mode is the enlarged live-view display mode in the determination of Step S101, or when the current mode is changed to the enlarged live-view display mode in the determination of Step S105, the CPU 112 calculates the acquisition range of the image signal in the imaging device 103, based on the current position of the enlargement frame 111a and the magnification set by operation of the operation section 113 by the user (Step S107).

Figure 5:
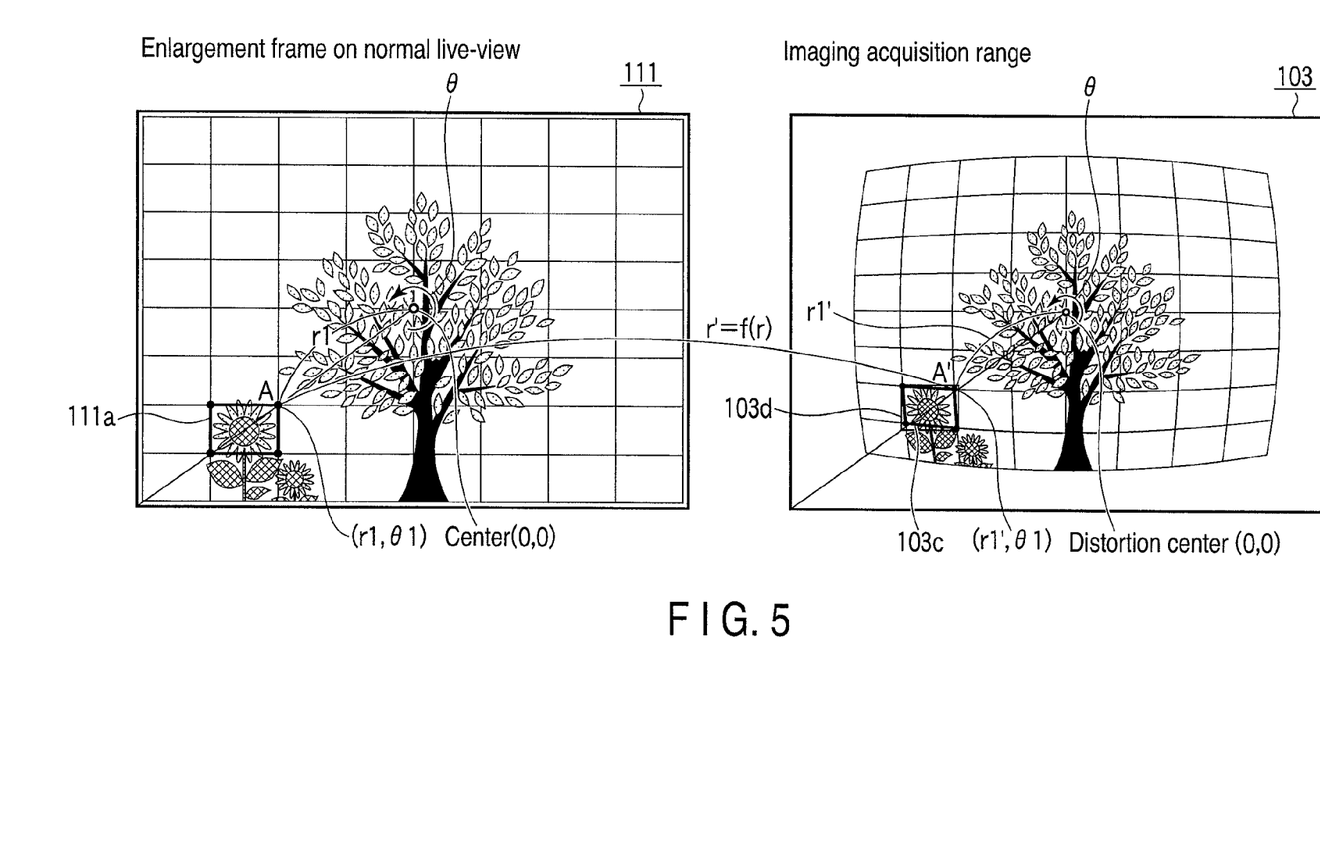
FIG. 5 is a diagram for explaining an example of a method of calculating a range of capturing an image signal in an enlarged live-view display mode.

FIG. 5 is a diagram for explaining an example of a method of calculating the acquisition range of the image signal in the enlarged live-view display mode. As described above, the image displayed on the display section 111 in normal live-view display is an image which has been subjected to distortion correction. On the other hand, the subject image formed on the imaging device 103 is not distortion-corrected. Therefore, the acquisition range on the imaging device 103 to obtain an image data of the range of the enlargement frame 111a selected by the user during normal live-view display is obtained by transforming coordinate positions of the enlargement frame 111a into respective coordinate positions on the imaging device 103.

For example, as illustrated in FIG. 5, suppose that the central position on the screen of the display section 111 is the center (0, 0), and coordinates of any position on the screen of the display section 111 can be indicated by polar coordinates system which is formed of a distance r and declination θ based on the center (0, 0). In this case, for example, the coordinates of one vertex A of the enlargement frame 111a illustrated in FIG. 5 can be expressed as (r1, θ1). In the same manner, suppose that the central position on the photoelectric conversion surface of the imaging device 103 is a distortion center (0, 0) (which corresponds to the center (0, 0)), and any coordinates on the screen of the display section 111 can be expressed by polar coordinates system formed of distance r' and declination θ based on the distortion center (0, 0). In this case, for example, coordinates of position A' of the vertex A on the imaging device 103 in FIG. 5 can be expressed as (r1', θ1). In such relation, coordinate transformation between a position (r, θ) on the screen of the display section 111 and a position (r', θ) on the imaging device 103 corresponding to the position (r, θ) can be performed in accordance with the following expression. In Expression 1, a transformation expression of only the distance is shown. This is because the declination θ does not change.

$$r'=f(r) \qquad \text{(Expression 1)}$$

The function f(r) in the Expression 1 is a function of a high order, and a coefficient thereof is determined by distortion information. In addition, an expression obtained by subjecting the Expression 1 to inverse transformation corresponds to a transformation expression to perform distortion correction. When distortion is corrected, a function which corresponds to inverse transformation of the Expression 1 is obtained from distortion information.

The acquisition range can be calculated by using the relation of the Expression 1. For example, the position A' of the vertex A of the enlargement frame 111a on the imaging device 103 is (f (r1), θ1). In the same manner, coordinate transformation of coordinates of each position of the enlargement frame 111a is performed. Thereby, a range 103c of the enlargement frame 111a on the imaging device 103 is calculated. However, in consideration of simplification of the distortion correction processing, it is desirable that the acquisition range of the image signal has a rectangular shape. Therefore, the acquisition range is a range 103d which is a minimum circumscribed rectangle including the range 103c. Also in this case, the central position of the acquisition range should be made agree with the acquisition range 103d.

After the acquisition range 103d is calculated, the CPU 112 drives the imaging device 103 in the enlarged live-view display mode, to perform enlarged live-view display operation (Step S108).

Figure 6A:
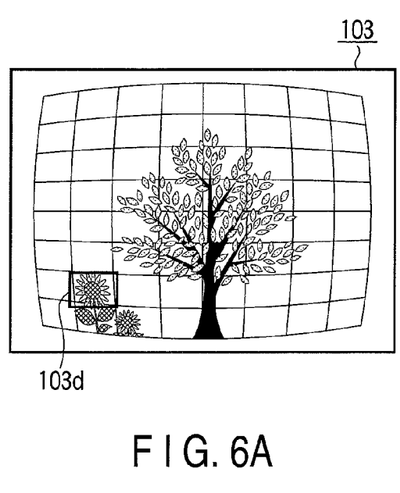
FIGS. 6A and 6B are diagram illustrating the acquisition range of the image signal in the enlarged live-view display mode.
Figure 6B:
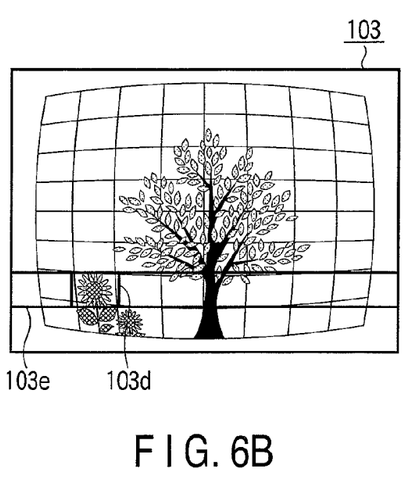

FIGS. 6A and 6B are diagrams illustrating an acquisition range of an image signal in the enlarged live-view display mode. When the imaging device 103 is an imaging device which can capture an image signal for each pixel, the CPU 112 controls the acquisition range to capture the image signal of the acquisition range 103d illustrated in FIG. 6A. In the enlarged live-view display mode, it is desirable to capture the image signal without interlacing. Specifically, the acquisition range in the enlarged live-view mode is smaller than the acquisition range in the normal live-view mode. Therefore, the time taken for capturing the image signal and the time taken for image processing are reduced, without performing interlacing to capture the image signal. Thus, in the enlarged live-view mode, the image signal is captured without interlacing, attaching importance to the resolution of the image. In addition, the subject image in the acquisition range is distorted by distortion of the lens 101. Such distortion of the image in the acquisition range is also corrected by image processing by the image processing section 108. On the other hand, when the imaging device 103 can only capture the image signal for each row, the CPU 112 controls the acquisition range such that a belt-like range 103e including the acquisition range 103d is used as an actual acquisition range, as illustrated in FIG. 6B.

Figure 7:
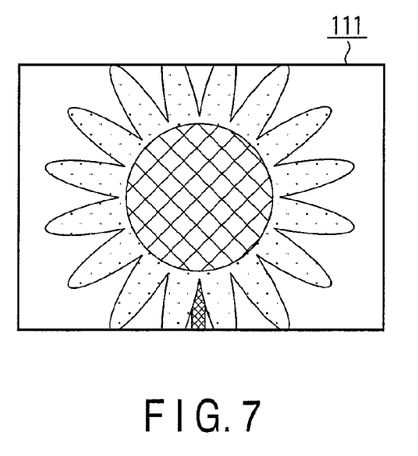
FIG. 7 is a diagram illustrating an example of an image displayed on the display section by enlarged live-view display operation.

After the imaging device 103 is driven, an image signal corresponding to the acquisition range 103d (or the acquisition range 103e) of the imaging device 103 is output. The image signal is amplified by the A-AMP 104, and thereafter converted into a digital image data by the ADC 105. Then, the image data is stored in the DRAM 107 through the bus 106. Thereafter, the CPU 112 issues an instruction to the image processing section 108 to perform image processing for the image data stored in the DRAM 107. In receipt of the instruction, the image processing section 108 reads out the image data from the DRAM 107, and performs image processing such as distortion correction processing for the read image data (Step S109). Even when the acquisition range of the image signal is the acquisition range 103e, image processing is performed only for an image data corresponding to the acquisition range 103d. The image data which has been subjected to image processing by the image processing section 108 is stored in the DRAM 107. Thereafter, the CPU 112 issues an instruction to the video encoder 110 to perform enlarged live-view display. In receipt of the instruction, the video encoder 110 reads the image data, which has been resized in the image processing section 108 in accordance with the magnification set by operation of the operation section 113 by the user, from the DRAM 107, converts the read image data into an image signal, and then outputs the image signal to the display section 111 to display a live-view image (Step S110). FIG. 7 illustrates an example of an image displayed on the display section 111 by enlarged live-view display operation.

After enlarged live-view display is performed, the CPU 112 determines whether to change the live-view display mode to the normal live-view display mode (Step S111). In the determination, the CPU 112 determines to change the live-view display mode to the normal live-view display mode, for example, when the operation section 113 issues an instruction to change the mode to the normal live-view display mode, or when it is instructed on the menu screen of the digital camera 100 by the user to change the mode to the normal live-view display mode. When the mode is not changed to the normal live-view display mode in the determination of Step S111, the CPU 112 determines whether to stop the live-view display operation (Step S112). When the live-view display operation is to be ended in the determination of Step S112, the CPU 112 ends the processing of FIG. 2. Thereafter, the CPU 112 performs processing such as turning off the power of the digital camera 100, or performing photographing operation.

In addition, when the live-view display operation is not ended in the determination of Step S112, the CPU 112 obtains distortion information corresponding to the position information of the zoom lens and the focus lens (Step S113). Then, the CPU 112 determines whether the shape of distortion of the lens 101 has changed, based on the obtained distortion information (Step S114). When the distortion of the lens 101 is not changed in the determination of Step S114, the processing is returned to Step S108. In this case, the CPU 112 continues operation corresponding to the enlarged live-view display mode with the current acquisition range 103d (or the acquisition range 103e). On the other hand, when the distortion of the lens 101 has changed in the determination of Step S114, the CPU 112 updates the acquisition range of the image signal, based on the obtained distortion information (Step S115). Thereafter, the processing is returned to Step S108. In this case, the CPU 112 continues operation corresponding to the enlarged live-view display mode with the updated acquisition range 103d (or the acquisition range 103e).

Figure 8A:
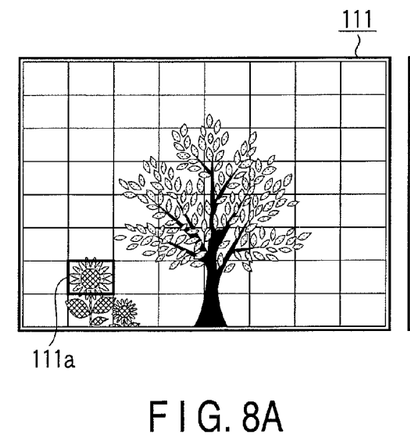
FIGS. 8A, 8B, 8C, and 8D are diagrams for explaining updating the acquisition range.
Figure 8B:
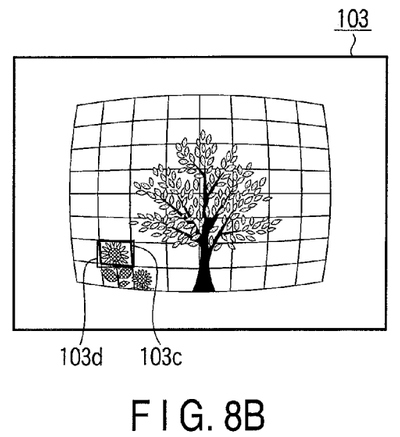

Update of the acquisition range will be explained hereinafter. As illustrated in FIG. 8A, the enlargement frame 111a is displayed in the normal live-view display mode, and the no/mal live-view display mode is changed to the enlarged live-view display mode by selecting the enlargement frame 111a. The acquisition range of the image signal in the enlarged live-view display of FIG. 8A is the range 103d which is a minimum circumscribed rectangle including the range 103c of the enlargement frame 111a on the imaging device 103, as illustrated in FIG. 8B. By performing enlarged live-view display operation to capture the image signal of the range 103d of FIG. 8B, it is possible to accurately display the image in the enlargement frame 111a of FIG. 8A by enlarged live-view display.

Figure 8C:
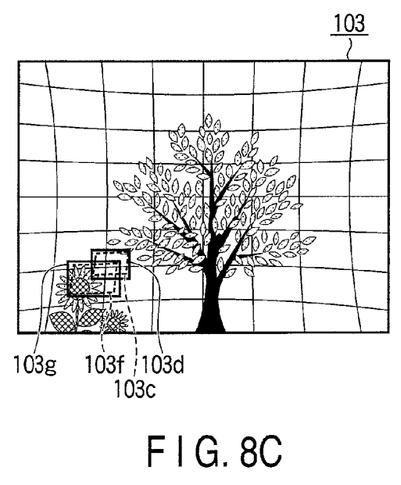

Suppose that the distortion of the lens 101 is changed by change of the position of the zoom lens or the like during enlarged live-view display. For example, FIG. 8C illustrates a state of the subject image formed on the imaging device 103, when the distortion of the lens 101 is changed to a pin-cushion shape in the state of FIG. 8B. Even when the distortion of the lens 101 is changed, a relative position of the enlargement frame 111a displayed on the display section 111 to the whole angle of view of the image obtained through the imaging device 103 is not changed, as long as the user does not move the enlargement frame 111a. Therefore, as illustrated in FIG. 8C, the range of the enlargement frame 111a on the imaging device 103 after change of the distortion is changed from the range 103c to a range 103f. Thus, it is necessary to update the acquisition range of the image signal to a range 103g of a minimum circumscribed rectangle including the range 103f. If the acquisition range is not updated, an image based on the image signal in the range 103d of FIG. 8C is subjected to enlarged live-view display, and provides the user with a feeling that something is wrong.

Figure 8D:
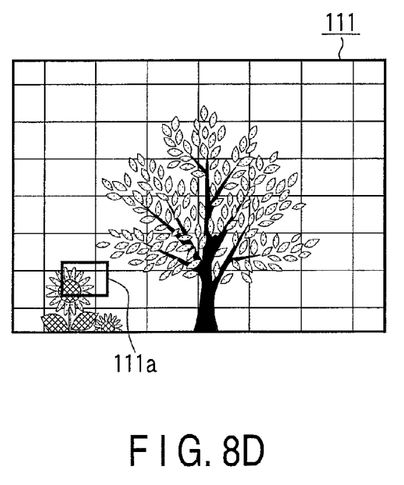

The processing of updating the acquisition range at Step S115 is processing to prevent the relative positions of images, which are displayed by enlarged live-view display before and after change of the distortion, from changing with respect to the whole angle of view of the image obtained through the imaging device 103. As specific processing performed at Step S115, the CPU 112 calculates the range of the enlargement frame 111a on the imaging device 103 after change of the distortion in accordance with the Expression 1, and determines a minimum circumscribed rectangle including the calculated range as a new image signal acquisition range. By performing such processing, the image in the enlargement frame 111a can be accurately displayed by enlarged live-view display before and after change of the distortion, as illustrated in FIG. 8D.

As described above, according to the present embodiment, the acquisition range of the image signal is controlled, such that the relative positions of images which are subjected to enlarged live-view display before and after change of the distortion do not change with respect to the whole angle of view of the image obtained through the imaging device 103, when the distortion of the lens 101 is changed. Thereby, an image corresponding to the position of the enlargement frame 111a can be always subjected to enlarged live-view display, regardless of change of the distortion, and it is possible to perform enlarged live-view display which does not provide the user with a feeling that something is wrong.

The above embodiment shows an example in which the lens 101 is formed as one unitary piece with the main body of the digital camera 100. In comparison with this, the method of the present embodiment is also applicable to digital cameras, lenses of which are changeable. In such a case, distortion information is stored in interchangeable lenses, and the distortion information is obtained by communication between the main body of the digital camera 100 and the interchangeable lenses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An imaging apparatus comprising:
an imaging section including a lens to form a subject image, which obtains an image data by imaging the subject image formed by the lens;
an imaging acquisition range control section which controls an acquisition range of the image data obtained by the imaging section, such that a part of the subject image is read out;
a distortion information obtaining section which obtains distortion information of the lens;
a distortion correction section which corrects distortion of the image data in the acquisition range obtained by control of the imaging acquisition range control section, in accordance with the distortion information obtained by the distortion information obtaining section; and a display section which performs enlarged live-view display operation to display an image obtained by enlarging the image data in the acquisition range, the image data in the acquisition range corrected by the distortion correction section, wherein the imaging acquisition range control section updates the acquisition range, when the distortion information of the lens is changed while the enlarged live-view display operation is performed by the display section, in accordance with the changed distortion information of the lens, wherein the distortion correction section determines the acquisition range of the image data obtained by the image section based on the distortion information, wherein the imaging acquisition range control section acquires the image data from the imaging section based on the acquisition range of the image data by capturing an image signal for each pixel of a photoelectric conversion surface without interlacing, and wherein the image acquisition range control section acquires the image data of a whole pixel range of the imaging device by capturing image signals with interlacing, when the display section performs non-enlarged live-view display operation to display an image data of the whole pixel range of the imaging device.

2. The imaging apparatus according to claim 1, wherein the lens includes a zoom lens to change an angle of view of the image data obtained by the imaging section, and the distortion information obtained by the distortion information obtaining section is information based on position information of the zoom lens.

3. The imaging apparatus according to claim 1, wherein the lens includes a focus lens to adjust a focus position of the lens, and the distortion information obtained by the distortion information obtaining section is information based on position information of the focus lens.

4. An imaging method comprising:

imaging a subject image, which is formed by a lens to form the subject image, by an imaging device, and thereby obtaining an image data;

obtaining distortion information of the lens;

controlling an acquisition range of the image data obtained by the imaging device such that a part of the subject image is read out, in accordance with change of the distortion information of the lens;

correcting distortion of the image data in the acquisition range, in accordance with the obtained distortion information;

enlarging the image data in the acquisition range, the distortion of which has been corrected; and displaying an image based on the enlarged image data on a display section, wherein the controlling the acquisition range includes:

determining the acquisition range of the image data obtained by the imaging device based on the distortion information, acquiring the image data from the imaging device based on the acquisition range of the image data by capturing an image signal for each pixel of a photoelectric conversion surface without interlacing, and acquiring the image data of a whole pixel range of the imaging device by capturing image signals with interlacing, when displaying an image based on a non-enlarged image data on a display section.

* * * * *